United States Patent
Kondapalli et al.

(10) Patent No.: US 9,544,317 B2
(45) Date of Patent: Jan. 10, 2017

(54) IDENTIFICATION OF POTENTIAL FRAUDULENT WEBSITE ACTIVITY

(71) Applicant: Verizon Patent and Licensing Inc., Arlington, VA (US)

(72) Inventors: Rajitha R. Kondapalli, Edison, NJ (US); Krishna Reddy, Irvine, CA (US); Iyer Kasinath, Basking Ridge, NJ (US); Rajesh Ranjan, Princeton, NJ (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 240 days.

(21) Appl. No.: 14/556,678

(22) Filed: Dec. 1, 2014

(65) Prior Publication Data

US 2016/0156641 A1    Jun. 2, 2016

(51) Int. Cl.
| | | |
|---|---|---|
| *G06F 21/00* | (2013.01) | |
| *H04L 29/06* | (2006.01) | |
| *G06F 21/62* | (2013.01) | |
| *G06F 21/55* | (2013.01) | |

(52) U.S. Cl.
CPC ......... *H04L 63/1408* (2013.01); *G06F 21/554* (2013.01); *G06F 21/6245* (2013.01); *G06F 2221/2119* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,321,945 | B2 * | 11/2012 | Nakagawa | G06F 21/552 726/1 |
| 8,554,835 | B1 * | 10/2013 | Williams | G06Q 50/01 705/319 |
| 9,292,830 | B2 * | 3/2016 | Fleet | G06Q 10/10 |
| 2014/0074550 | A1 * | 3/2014 | Chourey | G06Q 30/02 705/7.29 |
| 2014/0373174 | A1 * | 12/2014 | Bao | G06F 21/31 726/27 |

* cited by examiner

*Primary Examiner* — Beemnet Dada

(57) ABSTRACT

Identification of potential fraudulent website activity is performed based on log entry analysis. A log entry representing a user referral from an external referrer is processed to determine whether the referred user performed a log in procedure at a user account website of an organization. The external referrer is, for example, a phishing website. In one example, the referred user first accesses an enterprise website of the organization via the phishing website and subsequently accesses the user account website via the phishing website. In an alternate example, the referred user only accesses the user account website via the phishing website. Upon determining the referred user performed a log in procedure at the user account website, a fraud prevention system is notified.

18 Claims, 7 Drawing Sheets

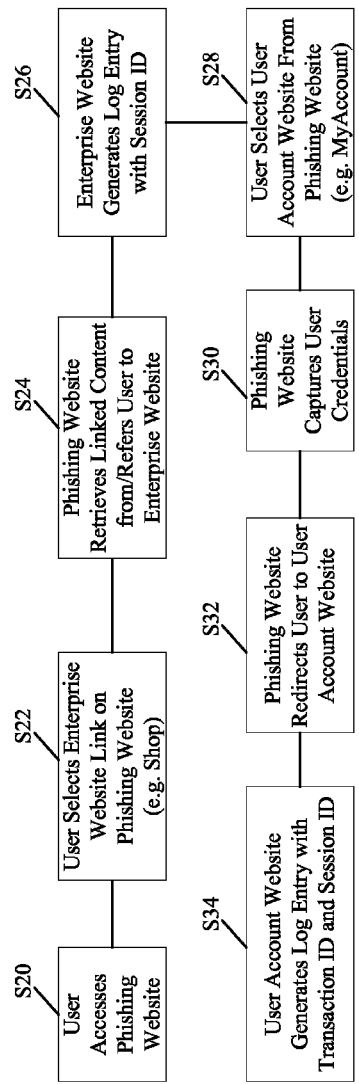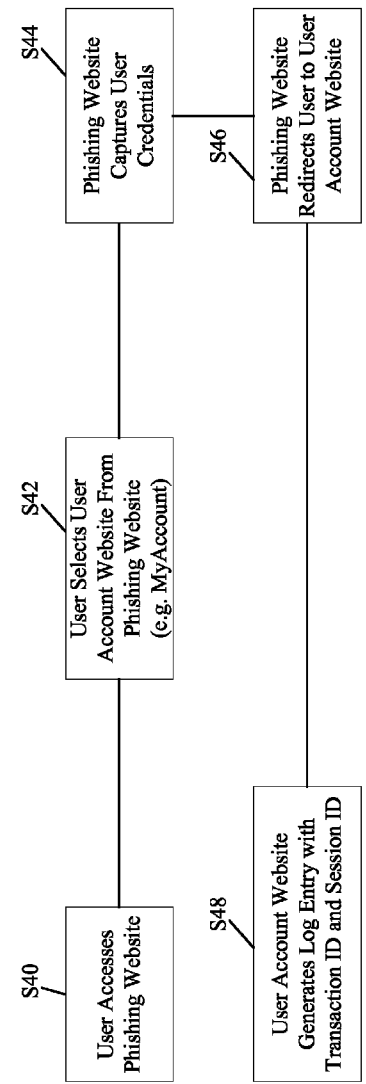
FIG. 2A
FIG. 2B

310 — hostip: "192.168.1.10",
312 — clientip: "10.1.2.3",
314 — verb: "GET",
316 — request: "/b2c/support/order-status",
318 — response: "200",
320 — bytes: "18628",
322 — referrer: "http://www.phishingsite.com/2014/09/how-to-check-pre-order-status.html",
324 — globalid: "u9OKcO0thKuzr0iuUMDqI2BQTdFvRhWobEFYRSLvNbOZOtcR%2BK8%2Bez%2BNYtKYq4W6"

*FIG. 3*

410 — clientip: "10.3.2.1",
412 — auth: "10eb67ac-2f5b-4a9a-b3fe-a109645c7194",
414 — verb: "POST",
416 — request: "/secure/promo/updateRMPresented.action",
418 — response: "200",
420 — bytes: "28",
422 — referrer: "https://www.enterprisesite.com/secure/router.action",
424 — globalid: "u9OKcO0thKuzr0iuUMDql2BQTdFvRhWobEFYRSLvNbOZOtcR%2BK8%2Bez%2BNYtKYq4W6"

*FIG. 4*

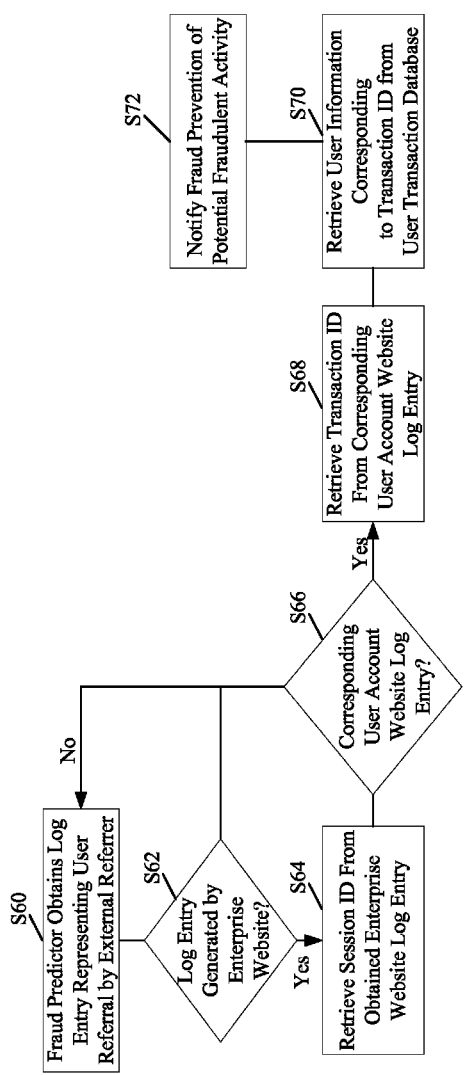
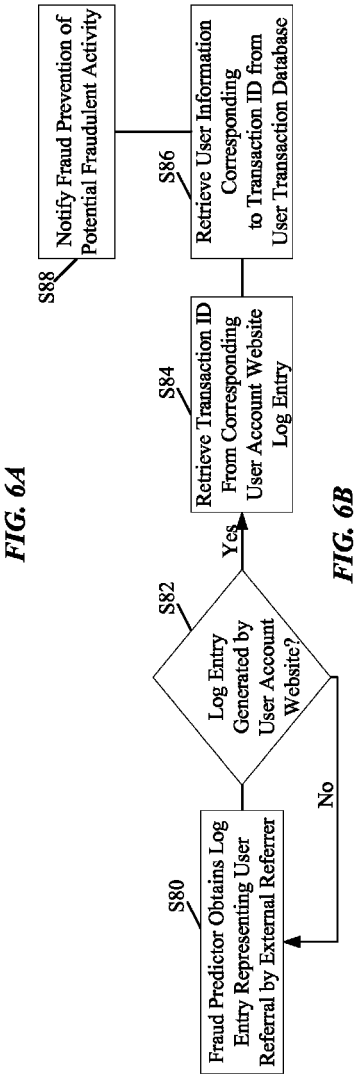
FIG. 6A
FIG. 6B

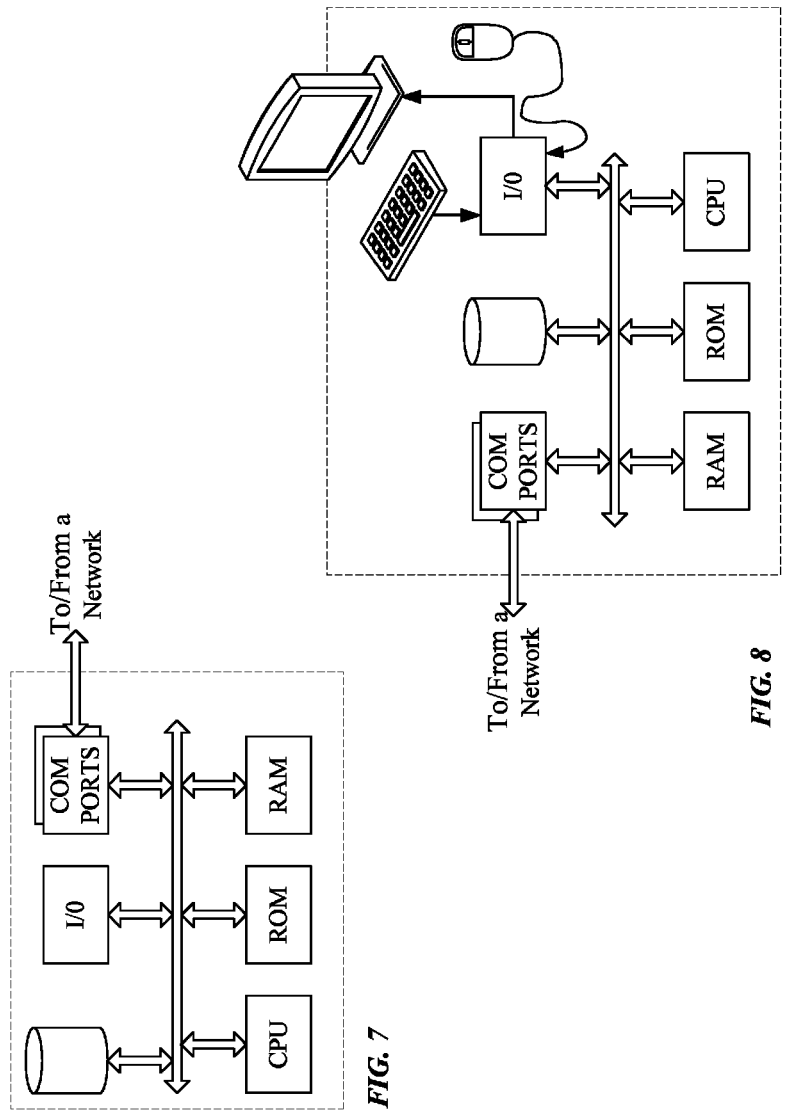

IDENTIFICATION OF POTENTIAL FRAUDULENT WEBSITE ACTIVITY

BACKGROUND

In recent years, the popularity of the Internet and, particularly websites that facilitate financial transactions as well as managing personal information, has exploded. At the same time, however, the ability to replicate websites, and the content provided by those websites, has become very commonplace. In order to provide security for transactional and personal information, websites often require a user to present credentials (e.g., username and password, digital certificate, passphrase, biometric, etc.) in order to verify the user and determine that the user should have access to the information. Despite these security measures to verify users, an individual user may be tricked, for example, into providing credentials to a fraudulent website that has replicated an original website that the individual user intended to access. In this way, the operator of the fraudulent website, having captured verifiable credentials from the individual user, may access the original website and perform fraudulent activity while appearing to be the individual user.

Phishing is a term commonly used to refer to a class of attacks that utilize a fraudulent replicated website to trick an individual user into providing the individual user's credentials to an unintended third party (e.g., an operator of the fraudulent website). In one common approach, the unintended third party sends a message (e.g., e-mail, text, social media post, etc.) to the targeted individual. The message, for example, appears to be from a legitimate source, such as a bank, service provider or other legitimate organization with which the targeted individual has an existing relationship. Typically, the message indicates the targeted individual should, or otherwise invites the targeted individual to, access a website operated by the legitimate organization. The message also includes, for example, a link or other means purported to provide such indicated or otherwise invited access. Unbeknownst to the targeted individual, however, the included link or other means actually links to a fraudulent replicated website operated by the unintended third party.

If the targeted individual user, for example, selects the link or other means, the targeted individual will be directed to a website that appears to be operated by the legitimate organization when, in fact, the website is a fraudulent replica operated by the unintended third party. Such deception may be enhanced by pulling, in various ways, original content directly from the website operated by the legitimate organization and presenting this original content to the targeted individual user. The targeted individual user, believing the fraudulent replica to be the website operated by the legitimate organization, may then proceed to provide credentials of the targeted individual user, for example, as part of a log in procedure. Once the fraudulent replica website has captured the provided credentials, the fraudulent replica website may then refer the targeted individual user to the website operated by the legitimate organization. Such referral may, for example, include the provided credentials and prompt a log in procedure to be performed by the website operated by the legitimate organization such that the targeted individual user is logged in to the legitimate website operated by the legitimate organization. In this way, the targeted individual user is provided, ultimately, with access to desired transactional or personal information from the website operated by the legitimate organization without realizing the credentials have been provided to and captured by the fraudulent replica website. The operator of the fraudulent replica website, for example, may then utilize the captured credentials to also access the website operated by the legitimate organization to perform fraudulent activity.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2A is a flow diagram of an example of user activity related to a phishing website including generation of log entries that may be used to identify potentially fraudulent website activity.

FIG. 2B is a flow diagram of an example of alternative user activity related to a phishing website including generation of a log entry that may be used to identify potentially fraudulent website activity.

FIG. 3 is an example of information contained within a log entry generated by an organization's website that may be used in the identification of potential fraudulent website activity.

FIG. 4 is an example of information contained within an additional or alternative log entry generated by an additional or alternative website of the organization, which may be used in the identification of potential fraudulent website activity.

FIG. 6A is a flow diagram of an example of further detailed steps involved in the identification of potential fraudulent website activity.

FIG. 6B is a flow diagram of an example of alternative or additional further detailed steps involved in the identification of potential fraudulent website activity.

FIG. 7 provides a block diagram of a general purpose computer hardware platform that may be configured as a host or server, for example, to function as any of the server computers shown in FIG. 1.

FIG. 8 is a simplified functional block diagram of a personal computer or other work station or terminal device.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Given the ease with which a phishing attack may be performed and the growing success of such attacks, legitimate organizations operating websites that seek to secure transactional or personal information based on user credentials have a desire to identify potential fraudulent website activity. In addition, such identification of potential fraudulent website activity should occur as quickly as possible or otherwise as soon as possible after potential fraudulent website activity occurs.

In one example, when a user accesses a website operated by a legitimate organization, the website generates a log entry. The log entry includes, for example, information identifying a session of communication between the user and the website as well as information indicating whether and from where the user was referred for access to the website. This information can be used to determine whether the source of the referral is a fraudulent website associated with a phishing attack. If the source of the referral is determined to be fraudulent, in the example, a fraud prevention system can be notified of the potential fraudulent website activity. In this way, identification of potential fraudulent website activity is performed based on analysis of log entries as they are generated in order, for example, to reduce any delay in the identification of potentially fraudulent website activity.

Figure 1:
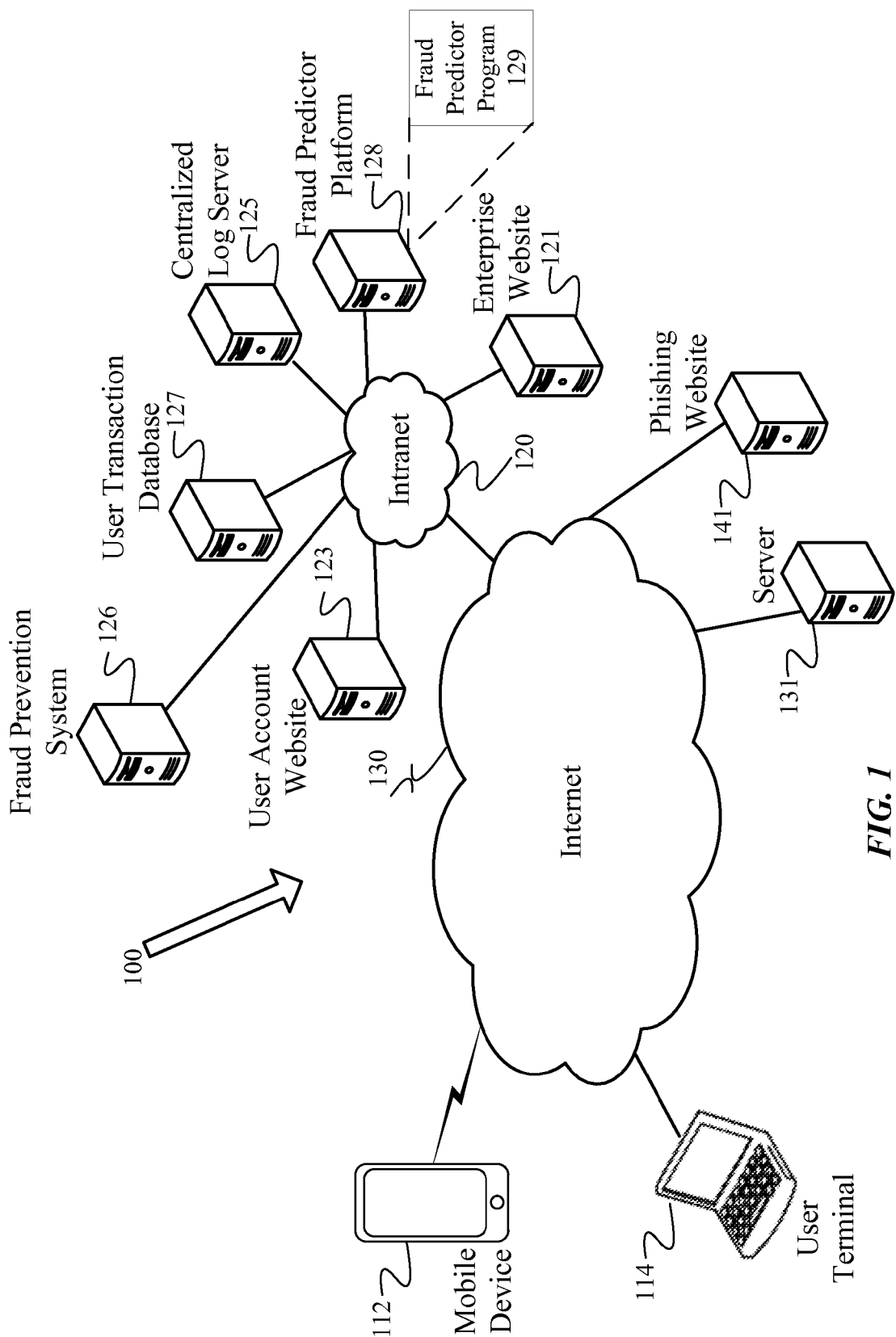
FIG. 1 is a functional block diagram of an example of a system in which identification of potential fraudulent website activity may be performed.

Reference now is made in detail to the examples illustrated in the accompanying drawings and discussed below. FIG. 1 is a functional block diagram of an example of a system 100 that supports various communications and in which identification of potential fraudulent website activity may be performed.

The illustrated system 100 services any number of end user data devices, including the illustrated mobile device 112 and other user terminal 114. Mobile device 112 and/or user terminal 114 may be a laptop, a personal digital assistant ("PDA"), a smartphone, a tablet PC or another portable device designed to communicate via a wired or wireless network. The mobile device 112 in our example corresponds to a smartphone or tablet itself having network communication capability and a user interface, which in this discussion, may be used for access to various websites including one or more websites of an organization having or affiliated with a fraud predictor performing identification of potential fraudulent website activity. The user terminal 114 in our example corresponds to a laptop, desktop or other personal computer itself having network communication capability and a user interface, which in this discussion, similarly may be used for access to various websites including one or more websites of the organization having or affiliated with the fraud predictor performing identification of potential fraudulent website activity. The mobile device 112 and/or the user terminal 114 run various application programs, one of which is a web access program, such as a browser, to access various websites using communications through the system of FIG. 1. As discussed in more detail below, that access may trigger identification of potential fraudulent website activity.

The illustrated system example includes a public data communications network, e.g. Internet 130. Data communications via the Internet 130 provided for users of devices like 112 and 114 may support a variety of services such as communications of text and multimedia messages, e-mail, web browsing, streaming or downloading content, etc. with network connected equipment represented generically by the server 131 in the drawing. Such services may be implemented as an App or client application (not shown) running on mobile device 112 and/or user terminal 114 and connecting to an application server, such as server 131.

The illustrated system example also includes a private data communications network, e.g. Intranet 120, that provides data communications for data systems operated by an organization. The organization is, for example, a company (e.g., large enterprise, small business, etc.), a governmental entity, a group, an individual or any other party providing product(s) and/or service(s) to any number of users. The Intranet 120 is interconnected with the Internet 130 in order to facilitate access to one, some number, or all of the data systems operated by the organization by individual users of devices such as mobile device 112 and user terminal 114. For purposes of the present discussion, equipment of the organization communicating via the Intranet 120 includes an enterprise website 121, a user account website 123, a centralized log server 125, a fraud prevention system 126, a user transaction database 127 and a fraud predictor platform 128. Fraud predictor platform 128 includes, for example, a fraud predictor program 129 stored in storage. Although the various equipment of the organization communicating via Intranet 120 are depicted as separate physical machines, such separation is only for simplicity and no such physical separation is required. The enterprise website 121 and the user account website 123, in the examples, are application server software components for which functionality is implemented on one or more network connected computer platforms. Similarly, centralized log server 125, fraud prevention system 126, user transaction database 127 and fraud predictor 129 are software components for which functionality is implemented on one or more network connected computer platforms.

Enterprise website 121, in one example, is a website operated by the organization to provide publically accessible information without requiring user credentials (e.g., www-.organization.com). User account website 123, in this example, is a website operated by the organization that requires user credentials in order to provide information (e.g., myaccount.organization.com). That is, anyone may be able to access enterprise website 121 to browse information the organization offers to the public, but only a user who has provided appropriate user credentials may be able to access user account website 123 and thus an account the user has with the particular organization. In one example, user account website 123 contains transactional or personal information related to the user. In a further example, user account website 123 allows the user to purchase and/or manage a service (e.g., mobile wireless access, Internet access, television service, banking, insurance, etc.) or product (e.g., mobile device, book, etc.) provided by the organization to the user.

For example, the organization operates enterprise website 121 in order to provide information about product(s) and/or service(s) provided by the organization. A user accesses such an enterprise website 121 in order to learn more about those product(s) and/or services(s), for example, via mobile device 112 or user terminal 114. In order for the user to purchase product(s) and/or service(s), the organization may require the user to create a user account. This created user account is accessible, for example, via the user account website 123. To enhance security, user account website 123 may require user credentials of the user, e.g. a username and password. After providing such user credentials, the user is able, for example, to access the user account website 123 and complete any contemplated purchase and/or otherwise manage the user's account with the organization. The user can reach the user account website 123 directly; or the user may be referred to that site 123 by enterprise website 121 or by another known legitimate referrer website.

When the user accesses enterprise website 121, enterprise website 121 generates a log entry containing information about the user and the user access. Such enterprise website log entry is described in greater detail below in relation to FIG. 3. The generated enterprise website log entry is stored in a log server, such as centralized log server 125. Similarly, when the user accesses user account website 123, user account website 123 also generates a log entry containing information about the user and the user access. Such user account website log entry is described in greater detail below in relation to FIG. 4. The generated user account website log entry is also stored in a log server, such as centralized log server 125. Thus, centralized log server 125 collects and stores log entries from various websites of the organization (e.g., enterprise website 121, user account website 123) such that subsequent log entry analysis may be performed. Although FIG. 1 depicts a single log server 125 that is centralized so as to handle and provide access to entries logged by several of the organization's websites, this is only for simplicity and no such requirement exists. Each website operated by the organization may store generated log entries in a respective log server. Alternatively, or in addition, generated log entries may be stored in a respective log server as well as centralized log server 125.

In addition, after the user has provided user credentials to user account website 123 and user account website 123 verifies the provided user credentials, user account website 123 generates, for example, a transaction identifier related to the user and the user's access to user account website 123. The transaction identifier is, for example, an alphanumeric string. The generated transaction identifier, as well as other information related to the user, is stored, for example, in user transaction database 127. In one example, the transaction identifier is an indication that the user has logged in to the user account website 123. The other information includes, for example, an account number associated with the user and another user or device related identifier. Where the organization is a carrier offering telephone or mobile network services, for example, the other identifier may be a phone number, such as a mobile telephone number, associated with the user. The transaction identifier, in the example, is also included in the log entry generated by user account website 123, as described in greater detail below.

The illustrated system example further includes phishing website 141 connected to the public data network 130. Phishing website 141, in the examples, is an application server software component for which functionality is implemented on one or more network connected computers. Specifically, phishing website 141 represents a fraudulent external website that replicates a legitimate website of an organization.

In one example, a user is directed to phishing website 141, as described above, based on a received message. Although phishing website 141 is, for example, a fraudulent replica of enterprise website 121, such replication is performed in a manner such that, when the targeted user accesses phishing website 141, phishing website 141 pulls related content directly from enterprise website 121. Alternatively, or in addition, the targeted user selects a link, for example, from phishing website 141 that redirects the user directly to enterprise website 121. In this way, phishing website 141 refers the user to enterprise website 121 and, because phishing website 141 is not operated by the organization, phishing website 141 is considered an external referrer. In either case, enterprise website 121, as described above and in greater detail below, generates one or more log entries related to the user access via phishing website 141. As described in greater detail below, such log entry includes information indicating phishing website 141 referred the user to enterprise website 121.

As another example, phishing website 141 includes one or more links or other means for the user to also access user account website 123. That is, the user may access user account website 123 via phishing website 141. In this way, phishing website 141 refers the user to user account website 123 and, because phishing website 141 is not operated by the organization, phishing website 141 is considered an external referrer. Such user access to user account website 123 via phishing website 141 prompts user account website 123 to generate, as described above and in greater detail below, one or more log entries including information indicating phishing website 141 referred the user to user account website 123.

Fraud predictor 129, as described in greater detail below, performs analysis of the various log entries collected and stored in centralized log server 125 to identify potential fraudulent website activity based on the referral information indicating phishing website 141 referred the user to the user account website 123 for log in. Upon identification of potentially fraudulent website activity, fraud predictor 129 may notify fraud prevention system 126 of such potentially fraudulent activity.

While various elements of FIG. 1 are depicted as connected via Intranet 120 and operated by a single organization, this is only for simplicity and no such requirement exists. For example, some elements, such as centralized log server 125, fraud predictor platform 128 and/or fraud prevention system 126, may be operated by one or more additional organizations. In one such example, fraud predictor platform 128 is operated by another organization and provides identification of potentially fraudulent activity on behalf of various multiple organizations. Alternatively, or in addition, fraud prevention system 126 may be operated by yet another organization or the same organization operating fraud predictor platform 128 and fraud prevention system 126 may provide support to the same or different various multiple organizations. As such, identification of potentially fraudulent website activity may be offered as a service in support of some number of websites operated by some number of organizations.

FIGS. 2A-2B depict examples of process flows related to a user accessing enterprise website 121 and user account website 123 via phishing website 141. While FIG. 2A depicts, for example, the steps involved when a user accesses both enterprise website 121 and user account website 123 via phishing website 141, FIG. 2B depicts, for example, the steps involved when a user accesses only user account website 123 via phishing website 141. Both flows generate one or more log entries for the fraud predictor 129 to analyze to detect potentially fraudulent website activity. For purposes of discussion regarding potential fraud, these flow diagrams assume referrals via the phishing website 141.

In step S20 of FIG. 2A, a user accesses phishing website 141. In one example, the user receives a message prompting the user to access a website operated by a legitimate organization, such as enterprise website 121. The organization may have an existing relationship with the user and/or the user may otherwise desire to access the website. The message, in the example, contains a link purporting to direct the user to enterprise website 121; however, the link actually directs the user to phishing website 141. As discussed above, phishing website 141, when accessed by the user in step S20, presents a replica of enterprise website 121 to the user. After accessing phishing website 141 in step S20, the user wishes, for example, to learn more about the organization and/or product(s) and/or service(s) provided by the organization. As such, in step S22, the user selects, for example, a link for additional information provided by enterprise website 121 on the phishing website 141. To the user, it appears that the link will take the user to a store or other portion of enterprise website 121 that allows the user to access additional information related to the organization.

As a result of the link selection (S22), phishing website 141, in step S24, retrieves, for example, the linked content from enterprise website 121 or otherwise refers the user to enterprise website 121. When a user initiates communication with enterprise website 121, enterprise website 121 generates a session identifier related to the user in order to identify subsequent communication between the user and enterprise website 121 or any other website operated by the organization, such as user account website 123, as part of a common session between the user and websites operated by the organization. The session identifier is, for example, an alphanumeric string. In one example, enterprise website 121 provides the session identifier to the user's terminal device (e.g., mobile device 112 or user terminal 114) as part of the provided information requested by the user. In a further example, the session identifier is provided as part of a "cookie" or other persistence information provided by enterprise website 121 to a web browser operated on the user's terminal device. In turn, the user's terminal device and/or web browser operated on the terminal device provides the session identifier as part of subsequent accesses to any of the websites operated by the organization. As described in greater detail below, log entries generated by the websites operated by the organization during the communication with the user/user device will include the same session identifier. In this way, the websites operated by the organization can identify multiple subsequent accesses by the user as part of a common session of communication between the user and the websites operated by the organization.

In step S26 of the process of FIG. 2A, enterprise website 121 generates a log entry. The log entry includes, for example, the session identifier. The log entry also includes, for example, an indication that the user was referred by phishing website 141. At some point in the browsing of website 121 via phishing website 141, the user decides to access user account website 123. In step S28, the user, for example, accesses user account website 123 via phishing website 141. As part of the access to user account website 123, the user is prompted to provide user credentials. In step S30, phishing website captures the provided user credentials.

As is known in the art, some website functionality may be performed by software or code running within a web browser operating on a user device, such as mobile device 112 or user terminal 114. In some examples, that website functionality performed on the user's device includes prompting a user to enter user credentials and providing the user credentials to the website. Thus, in one example, when the user accesses user account website 123 in step S28, phishing website 141, instead of user account website 123, provides functionality to be performed on the user's device to prompt the user to enter user credentials. Then, as part of step S30, that functionality provided by phishing website 141 delivers the provided credentials to phishing website 141. In turn, phishing website 141, in step S32, redirects the user to user account website 121. As part of the redirection in step S32, phishing website 141 also provides the captured user credentials to user account website 123. In this way, the user gains otherwise appropriate access to user account website 123 without realizing the user credentials have been captured by phishing website 141. Subsequently (not shown), the operator of phishing website 141 utilizes the captured user credentials to also access, for example, user account website 123 and performs fraudulent website activity. As many individuals use the same or similar credentials to access other websites not associated with the enterprise providing user account website 121, these other websites and associated user accounts may be jeopardized by capture of the credentials at phishing website 141.

In step S34, user account website 123 generates a log entry. The generated log entry includes, for example, the session identifier previously provided to the user's terminal device by enterprise website 121. In this way, the log entry generated by enterprise website 121 in step S26 will contain the same session identifier as contained in the log entry generated by user account website 123 in step S34. The generated log entry also includes, for example, a transaction identifier, as previously discussed, indicating that the user has completed a log in procedure as part of accessing user account website 123. Additionally, the generated log entry includes, for example, an indication that the user was referred by phishing website 141.

The process flow of FIG. 2B is similar to the process flow of FIG. 2A, except that the user does not access enterprise website 121 via phishing website 141. Instead, the user proceeds to access the user account website 123 from phishing website 141. As such, step S40 of FIG. 2B is identical to step S20 of FIG. 2A and steps S42-S44 of FIG. 2B are identical to steps S28-S30 of FIG. 2A. In addition, while step S46 of FIG. 2B is similar to step S32 of FIG. 2A, there is some difference not explicitly depicted in FIG. 2B.

As discussed above in relation to FIG. 2A, when a user accesses enterprise website 121 in step S24, enterprise website 121 generates a session identifier in order to identify subsequent communication from the user as part of a common session of communication. Then, when the same user subsequently accesses the user account website 123 in step S32 of FIG. 2A, that access includes the session identifier generated by enterprise website 121. As such, the log entry generated in step S26 and the log entry generated in step S34 each contain the same session identifier. In contrast, the user, in FIG. 2B, has not previously accessed enterprise website 121. Thus, when the user accesses user account website 123, the user's terminal device or web browser does not have a session identifier to provide as part of the access. However, similar to enterprise website 121, when user account website 123 is the first website of any websites operated by the organization accessed by the user, user account website 123 will also generate a session identifier. In other words, the first website accessed by a user will generate a session identifier that the user can subsequently provide to any of the websites operated by the organization in order to identify all of the communications between the user and the websites operated by the organization as part of a common session of communication. Hence, step S48 of FIG. 2B is similar to step S34 of FIG. 2A except the session identifier was generated by end user website 123 and not enterprise website 121.

FIG. 3 depicts an example of a portion of a first log entry generated by a website, such as enterprise website 121. The first log entry includes, for example, hostip field 310, clientip field 312, verb field 314, request field 316, response field 318, bytes field 320, referrer field 322 and globalid field 324. The hostip field contains, for example, an internet protocol (IP) address associated with the website generating the log entry (e.g., the address of enterprise website 121). Similarly, clientip field 312 contains, for example, an IP address associated with the client or user device accessing the website (e.g., the address of the mobile device 112 or the user terminal 114).

The verb field 314 contains, for example, an indication of a type of request that prompted the website to generate the log entry. For example, if the client or user device issued a hypertext transport protocol (HTTP) GET request as part of the access to the website, the verb field 314 would contain "GET". Alternatively, if the client or user device issued a HTTP POST request, the verb field 314 would contain "POST".

The request field 316 contains, for example, the object requested by the client or user device. For example, if the client or user device requests a webpage entitled "order-status" located within a sub-directory entitled "support" of a directory entitled "b2c", the request field 316 would contain "/b2c/support/order-status".

Response field 318 contains, for example, a status value associated with a response to the request prompting generation of the log entry. In general, a successful response is indicated by "200" in the response field 318. In addition, bytes field 320 contains, for example, the amount of data transferred, in bytes, as part of the response to the request prompting generation of the log entry.

As described above, a user may be referred to the website generating the log entry by another website, such as phishing website 141. When such a user referral occurs, referrer field 322 contains, for example, an indication of the source of such user referral (e.g., a uniform resource locator (URL) of the referring website). In this way, the organization operating the website generating the log entry may be able to identify whether and how a user was referred to the website.

As also described above, when a user accesses a first website of one or more websites operated by an organization, the first website generates a session identifier in order to identify subsequent communication from the user as part of a common session of communication between the user and the one or more websites. Such session identifier is stored, for example, in globalid field 324 of the log entry. In this way, the organization operating the one or more websites may be able to identify multiple accesses by the same user as part of a common session of communication.

FIG. 4 depicts an example of a portion of a second log entry generated by a website, such as user account website 123. The second log entry includes, for example, several fields similar to fields included in the first log entry. Namely, the second log entry includes, for example, clientip field 410, verb field 414, request field 416, response field 418, bytes field 420, referrer field 422 and globalid field 424. As each field with a similar name contains similar, but not necessarily identical, information as described above in relation to FIG. 3, each field will not be described again. Although the meaning of the fields is the same, not all of the content will be the same in these fields for log entries generated by different websites or even subsequent log entries generated by the same website. For example, hostip 310 may contain the same value for all log entries generated by the same website while each of those log entries may contain a different value for clientip 312 (e.g., different users each accessing enterprise website 121). At the same time, an identical value may be contained in log entries generated by different websites as a result of activity involving the same user/user device in the same session. For example, globalid 324 and globalid 424 may contain the same session identifier for log entries generated by enterprise website 121 and user account website 123 when the user first accesses enterprise website 121 and then subsequently accesses user account website 123.

The second log entry also includes, for example, auth field 412. As described above, when a user completes a log in procedure to a website, such as user account website 123, the website generates a transaction identifier as an indication that the user completed the log in procedure. Such transaction identifier is stored, for example, in auth field 412. In this way, the organization operating the website generating the log entry may be able to identify when the user has logged in to the website.

Although FIGS. 3-4 depict an identical session identifier stored in both the first and second log entries, this is only for illustrative purposes and no such requirement exists. While the user activity in the process flow of FIG. 2A would result in log entries with an identical session identifier as depicted in FIGS. 3-4, the user activity in the process flow of FIG. 2B would only result in a log entry similar to FIG. 4 with no corresponding log entry similar to FIG. 3. The log entry similar to FIG. 4 generated by user account website 123 as a result of the user activity of FIG. 2B would, however, contain information indicating phishing website 141 as the referrer in referrer field 422.

Figure 5:
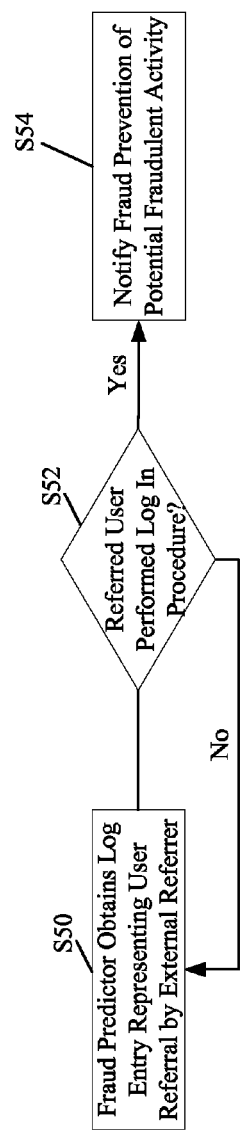
FIG. 5 is a flow diagram of an example of steps involved in the identification of potential fraudulent website activity.

FIG. 5 illustrates an example of a process flow to identify potential fraudulent website activity. In step S50, fraud predictor 129 obtains a log entry representing a user referral by an external referrer. Because not every log entry represents a user referral by an external referrer, or even a user referral of any kind, fraud predictor 129, in step S50, only obtains some portion of all log entries generated by the websites utilizing identification of potential fraudulent website activity as described herein. In one example, fraud predictor 129 obtains the log entry from centralized log server 125. In a further example, fraud predictor 129 only obtains the log entry if the external referrer is ineligible to refer users for access to the websites operated by the organization, such as enterprise website 121 and user account website 123.

An external referrer is a website, not operated by the organization, that refers users for access to one or more of the websites operated by the organization (e.g., to enterprise website 121, to user account website 123). Some number of external referrers may be known to and/or trusted by the organization and, in turn, some or all of the known and/or trusted external referrers may be eligible to refer users for access to the websites operated by the organization. A reseller, a broker, an agent, a marketer, an advertiser or some other entity authorized to represent or otherwise offer product(s) and/or service(s) provided by the organization is, for example, a known and/or trusted external referrer eligible to refer users for access to the websites operated by the organization. At the same time, a portion of known and/or trusted external referrers as well as external referrers generally unknown to and/or untrusted by the organization are, for example, ineligible to refer users for access to the websites operated by the organization. In one example, phishing website 141 is an external referrer. In a further example, phishing website 141 is unknown to and/or untrusted by the organization operating enterprise website 121 and user account website 123. In this further example, phishing website 141 is ineligible to refer users for access to the websites operated by the organization.

Fraud predictor 129, in step S52, determines whether the referred user performed a log in procedure, such as by logging in to user account website 123. If the referred user did not perform a log in procedure, the process flow returns to step S50 where fraud predictor 129 obtains another log entry representing another user referral by an external referrer. If the referred user did perform a log in procedure, the process flow progresses to step S54.

In step S54, fraud predictor 129 notifies a fraud prevention system 126 of potential fraudulent activity related to the user. The notification includes, for example, information related to the user and information indicating the external referrer.

As described above, a user may ultimately access user account website 123 via phishing website 141 by following one of two alternate paths. More specifically, the user may first access enterprise website 121 and then proceed to access user account website 123, as described above in relation to FIG. 2A. Alternatively, the user may proceed to access user account website 123 without first accessing enterprise website 121, as described above in relation to FIG. 2B. As such, FIGS. 6A-6B depict examples of two alternate process flows for determining whether a user performed a log in procedure, such as by logging in to user account website 123.

FIG. 6A illustrates an example of a process flow to determine whether a user performed a log in procedure when the user first accesses enterprise website 121. In step S60, similar to step S50 of FIG. 5, fraud predictor 129 obtains a log entry representing a user referral by an external referrer. Fraud predictor 129, in step S62, determines whether the log entry was generated by enterprise website 121. In one example, fraud predictor 129 determines the log entry was generated by enterprise website 121 based on a value contained in the hosted field 310 of the obtained log entry. Alternatively, or in addition, fraud predictor 129 determines the log entry was generated by enterprise website 121, for example, because fraud predictor 129 only obtains those log entries generated by enterprise website 121 from centralized log server 125. If the obtained log entry was not generated by enterprise website 121, the process returns to step S60 and fraud predictor 129 obtains another log entry.

If the obtained log entry was generated by enterprise website 121, the process proceeds to step S64. In step S64, fraud predictor 129 retrieves a first session identifier from the obtained log entry. In one example, the first session identifier is a value contained in the globalid field 324 of the obtained log entry. Fraud predictor 129 then determines, in step S66, whether the retrieved first session identifier relates to a second session identifier stored in a second log entry generated by user account website 123. In one example, the first session identifier relates to the second session identifier when the two session identifiers match or are identical. Thus, in step S66, fraud predictor 129 compares, for example, the first session identifier with the second session identifier contained in globalid field 424 of the second log entry. If the two session identifiers relate, the indication is that the user has performed a log in procedure, such as by logging in to user account website 123.

Although not explicitly depicted in FIG. 6A, step S66 is repeatedly performed, for example, for each log entry generated by user account website 123. Alternatively, step S66 is repeatedly performed, for example, only for each log entry generated by user account website 123 representing a user referral by any external referrer, a user referral by ineligible external referrers, or a user referral by the external referrer corresponding to the obtained enterprise website log entry. That is, for each obtained log entry generated by enterprise website 121, fraud predictor 129 determines whether any log entry generated by user account website 123 (or one or more of some portion of those generated log entries) corresponds by determining whether a common session identifier exists. If no corresponding log entry generated by user account website 123 exists, the process returns to step S60 and fraud predictor 129 obtains another log entry. If a corresponding log entry generated by user account website 123 exists, the process proceeds to step S68. The significance of such correspondence is that the user, referred by an unknown and potentially fraudulent website, has performed a log in procedure in which provided user credentials were captured by the unknown and potentially fraudulent website.

In step S68, fraud predictor 129 retrieves a transaction identifier from the corresponding log entry generated by user account website 123. For example, fraud predictor 129 retrieves a value contained in the auth field 412 of the corresponding log entry. The retrieved transaction identifier, in step S70, is used as a key, for example, to retrieve user information from user transaction database 127. As described above, user information stored in user transaction database 127 includes, for example, a mobile telephone number related to the user and an account number related to the user.

The retrieved user information is provided, for example, to a fraud prevention system, such as fraud prevention system 126, by fraud predictor 129 as part of a notice of potential fraudulent website activity, in step S72. The notice includes, for example, the retrieved user information, information related to the session (e.g., session identifier), information related to the log in procedure (e.g., transaction identifier) and information related to the external referrer. The fraud prevention system may use the provided information, for example, to contact the user and/or take other measures to mitigate the potential fraudulent website activity. In one example, fraud prevention system 126 attempts to contact the user and suspends access to the user's account on user account website 123. The contact may be, for example, a notification to the device being used to access enterprise website 121 and/or a mobile device of the user (e.g., popup, email, SMS). Such notification may inform the user of the issue and the unknown/untrusted website. In a further example, fraud prevention system 126 initiates an investigation of or otherwise attempts to identify and evaluate the external referrer (e.g., phishing website 141). As part of the investigation, for example, pending and/or previous transactions (e.g., any transactions occurring after a timestamp in the corresponding log entry generated by user account website 123) are suspended or otherwise placed on hold until confirmation by the user is made. Such confirmation may be made, for example, in response to the notification sent to the device being used to access enterprise website 121 and/or the mobile device of the user.

FIG. 6B illustrates an example of a process flow to determine whether a user performed a log in procedure when the user proceeds to access user account website 123 via phishing website 141 without first accessing enterprise website 121. In step S80, similar to steps S50 and S60, fraud predictor 129 obtains a log entry representing a user referral by an external referrer. Fraud predictor 129, in step S82, determines whether the obtained log entry was generated by user account website 123. In one example, fraud predictor 129 determines the log entry was generated by user account website 123 because fraud predictor 129 only obtains those log entries generated by user account website 123 from centralized log server 125. If the obtained log entry was not generated by user account website 123, the process returns to step S80 and fraud predictor 129 obtains another log entry.

If the obtained log entry was generated by user account website 123, the process proceeds to step S84. In step S84, fraud predictor 129 retrieves a transaction identifier from the obtained log entry generated by user account website 123. For example, fraud predictor 129 retrieves a value contained in the auth field 412 of the obtained log entry. Although not as significant as in the process flow of FIG. 6A, fraud predictor 129, as part of step S84, may also retrieve a session identifier from the obtained log entry generated by user account website 123. The session identifier is, for example, a value contained in the globalid field 424 of the obtained log entry.

The retrieved transaction identifier, in step S86, is used as a key, for example, to retrieve user information from user transaction database 127. As described above, user information stored in user transaction database 127 includes, for example, a mobile telephone number related to the user and an account number related to the user.

The retrieved user information is provided, for example, to a fraud prevention system, such as fraud prevention system 126, by fraud predictor 129 as part of a notice of potential fraudulent website activity, in step S88. The notice includes, for example, the retrieved user information, information related to the session (e.g., session identifier), information related to the log in procedure (e.g., transaction identifier) and information related to the external referrer. The fraud prevention system may use the provided information, for example, to contact the user and/or take other measures to mitigate the potential fraudulent website activity. In one example, fraud prevention system 126 attempts to contact the user and suspends access to the user's account on user account website 123. The contact may be, for example, a notification to the device being used to access user account website 123 and/or a mobile device of the user (e.g., popup, email, SMS). Such notification may inform the user of the issue and the unknown/untrusted website. In a further example, fraud prevention system 126 initiates an investigation of or otherwise attempts to identify and evaluate the external referrer (e.g., phishing website 141). As part of the investigation, for example, pending and/or previous transactions (e.g., any transactions occurring after a timestamp in the corresponding log entry generated by user account website 123) are suspended or otherwise placed on hold until confirmation by the user is made. Such confirmation may be made, for example, in response to the notification sent to the device being used to access user account website 123 and/or the mobile device of the user.

As shown by the discussion above, aspects of identification of potential fraudulent website activity may be implemented by appropriate programming of a mobile device and/or user terminal as well as programming of one or more server computers. It may be helpful to briefly consider computer platforms that may utilize relevant programming.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that the general structure and general operation of such equipment as shown in FIGS. 7 and 8 should be self-explanatory from the high-level illustrations.

A computer for use as a server, for example, includes a data communication interface for packet data communication (see FIG. 7). The server also includes a central processing unit (CPU), in the form of circuit elements for one or more processors, for executing program instructions. The server platform typically includes an internal communication bus, program storage, and data storage for various data files to be processed and/or communicated by the server, although the server computer often receives programming and data via network communications. The hardware elements, operating systems and programming languages of such computers are conventional in nature, and it is presumed that those skilled in the art are adequately familiar therewith. Of course, the server functions may be implemented in a distributed fashion on a number of similar computer hardware platforms, to distribute the processing load. The "server" and other software programming relating to identification of potential fraudulent website activity discussed herein may be downloaded and/or updated from a computer platform, for example, to configure the fraud predictor, enterprise website or other server (e.g. FIG. 1).

A computer type user terminal device, such as a PC or tablet computer, similarly includes a data communication interface, one or more processors forming a CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of identification of potentially fraudulent website activity outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory or tangible storage media, more general terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
    a processor;
    storage coupled to the processor; and
    a fraud predictor program stored in the storage, wherein execution of the fraud predictor program by the processor configures the system to implement functions, including functions to:
        obtain, from a computer platform configured as a log server for receiving log entries generated by websites operated by an organization, a first log entry representing access by a user to a first website operated by the organization, the user being referred to the first website by an external referrer and the external referrer being an external website not operated by the organization that refers users for access to one or more of the websites operated by the organization;
        determine whether the referred user performed a log in procedure for the first website or another one of the websites operated by the organization; and
        upon a determination that the referred user performed a log in procedure, notify a fraud prevention system of potential fraudulent activity related to the referred user;
        wherein the implemented function to obtain the first log entry is responsive to a determination that the external referrer is ineligible to refer users for access to the websites operated by the organization.

2. The system of claim 1, wherein:
    the implemented function to determine whether the referred user performed the log in procedure comprises functions to:
        determine whether the first log entry was generated by a computer platform configured as an enterprise website operated by the organization, the enterprise website providing publically available information without requiring user credentials;
        upon a determination that the first log entry was generated by the enterprise website operated by the organization, retrieve a first session identifier from the first log entry, the first session identifier representing a first session of communication between the referred user and the enterprise website operated by the organization;
        determine whether the retrieved first session identifier relates to a second session identifier stored in a second log entry generated by a computer platform configured as a user account website operated by the organization, wherein:
            the user account website requires user credentials in order to provide information; and
            the second session identifier represents a second session of communication between the referred user and the user account website operated by the organization;
        upon a determination that the retrieved first session identifier relates to the second session identifier, retrieve a transaction identifier from the second log entry, the transaction identifier indicating the referred user performed the log in procedure; and
        obtain, based on the transaction identifier, customer information from a computer platform configured as a user transaction database, the obtained customer information providing identification related to the referred user; and
    the implemented function to notify the fraud prevention system of potential fraudulent activity related to the referred user comprises a function to provide the obtained customer information to the fraud prevention system.

3. The system of claim 2, wherein the first session identifier relates to the second session identifier when the first and second sessions of communication are both part of a single session of communication between the referred user and both the enterprise website and the user account website.

4. The system of claim 2, wherein the obtained customer information comprises:

a mobile directory number related to the referred user; and
an account number related to the referred user.

5. The system of claim 1, wherein:
the implemented function to determine whether the referred user performed the log in procedure comprises functions to:
determine whether the first log entry was generated by a computer platform configured as a user account website operated by the organization, the user account website requiring user credentials in order to provide information;
upon a determination that the first log entry was generated by the user account website operated by the organization, retrieve a transaction identifier from the first log entry, the transaction identifier indicating the referred user performed the log in procedure; and
obtain, based on the transaction identifier, customer information from a computer platform configured as a user transaction database, the obtained customer information providing identification related to the referred user; and
the implemented function to notify the fraud prevention system of potential fraudulent activity related to the referred user comprises a function to provide the obtained customer information to the fraud prevention system.

6. The system of claim 5, wherein the obtained customer information comprises:
a mobile directory number related to the referred user; and
an account number related to the referred user.

7. A method, comprising:
obtaining, by a computer platform configured as a fraud predictor and from a computer platform configured as a log server for receiving log entries generated by websites operated by an organization, a first log entry representing access by a user to a first website operated by the organization, the user being referred to the first website by an external referrer and the external referrer being an external website not operated by the organization that refers users for access to one or more of the websites operated by the organization;
determining, by the fraud predictor, whether the referred user performed a log in procedure for the first website or another one of the websites operated by the organization; and
upon determining that the referred user performed a log in procedure, notifying, by the fraud predictor, a fraud prevention system of potential fraudulent activity related to the referred user;
wherein the step of obtaining the first log entry is responsive to determining that the external referrer is ineligible to refer users for access to the websites operated by the organization.

8. The method of claim 7, wherein:
the step of determining whether the referred user performed the log in procedure comprises:
determining, by the fraud predictor, whether the first log entry was generated by a computer platform configured as an enterprise website operated by the organization, the enterprise website providing publically available information without requiring user credentials;
upon determining that the first log entry was generated by the enterprise website operated by the organization, retrieving, by the fraud predictor, a first session identifier from the first log entry, the first session identifier representing a first session of communication between the referred user and the enterprise website operated by the organization;
determining, by the fraud predictor, whether the retrieved first session identifier relates to a second session identifier stored in a second log entry, wherein:
the fraud predictor obtains the second log entry from the centralized log server;
the second log entry was generated by a computer platform configured as a user account website operated by the organization;
the user account website requires user credentials in order to provide information; and
the second session identifier represents a second session of communication between the referred user and the user account website operated by the organization;
upon determining that the retrieved first session identifier relates to the second session identifier, retrieving, by the fraud predictor, a transaction identifier from the second log entry, the transaction identifier indicating the referred user performed the log in procedure; and
obtaining, by the fraud predictor and based on the transaction identifier, customer information from a computer platform configured as a user transaction database, the obtained customer information providing identification related to the referred user; and
the step of notifying the fraud prevention system of potential fraudulent activity related to the referred user comprises providing the obtained customer information to the fraud prevention system.

9. The method of claim 8, wherein the first session identifier relates to the second session identifier when the first and second sessions of communication are both part of a single session of communication between the referred user and both the enterprise website and the user account website.

10. The method of claim 8, wherein the obtained customer information comprises:
a mobile directory number related to the referred user; and
an account number related to the referred user.

11. The method of claim 7, wherein:
the step of determining whether the referred user performed the log in procedure comprises:
determining, by the fraud predictor, whether the first log entry was generated by a computer platform configured as a user account website operated by the organization, the user account website requiring user credentials in order to provide information;
upon determining that the first log entry was generated by the user account website operated by the organization, retrieving, by the fraud predictor, a transaction identifier from the first log entry, the transaction identifier indicating the referred user performed the log in procedure; and
obtaining, by the fraud predictor and based on the transaction identifier, customer information from a computer platform configured as a user transaction database, the obtained customer information providing identification related to the referred user; and
the step of notifying the fraud prevention system of potential fraudulent activity related to the referred user comprises providing the obtained customer information to the fraud prevention system.

12. The method of claim 11, wherein the obtained customer information comprises:
   a mobile directory number related to the referred user; and
   an account number related to the referred user.

13. A non-transitory machine-readable storage medium having instructions stored therein executable by a processor of a computer platform, wherein execution of the instructions by the processor configures the computer platform to perform functions, including functions to:
   obtain, from a computer platform configured as a log server for receiving log entries generated by websites operated by an organization, a first log entry representing access by a user to a first website operated by the organization, the user being referred to the first website by an external referrer and the external referrer being an external website not operated by the organization that refers users for access to one or more of the websites operated by the organization;
   determine whether the referred user performed a log in procedure for the first website or another one of the websites operated by the organization; and
   upon a determination that the referred user performed a log in procedure, notify a fraud prevention system of potential fraudulent activity related to the referred user;
   wherein the implemented function to obtain the first log entry is responsive to a determination that the external referrer is ineligible to refer users for access to the websites operated by the organization.

14. The storage medium of claim 13, wherein:
   the implemented function to determine whether the referred user performed the log in procedure comprises functions to:
     determine whether the first log entry was generated by a computer platform website providing publically available information without requiring user credentials;
     upon a determination that the first log entry was generated by the enterprise website operated by the organization, retrieve a first session identifier from the first log entry, the first session identifier representing a first session of communication between the referred user and the enterprise website operated by the organization;
     determine whether the retrieved first session identifier relates to a second session identifier stored in a second log entry generated by a computer platform configured as a user account website operated by the organization, wherein:
       the user account website requires user credentials in order to provide information; and
       the second session identifier represents a second session of communication between the referred user and the user account website operated by the organization;
     upon a determination that the retrieved first session identifier relates to the second session identifier, retrieve a transaction identifier from the second log entry, the transaction identifier indicating the referred user performed the log in procedure; and
     obtain, based on the transaction identifier, customer information from a computer platform configured as a user transaction database, the obtained customer information providing identification related to the referred user; and
   the implemented function to notify the fraud prevention system of potential fraudulent activity related to the referred user comprises a function to provide the obtained customer information to the fraud prevention system.

15. The storage medium of claim 14, wherein the first session identifier relates to the second session identifier when the first and second sessions of communication are both part of a single session of communication between the referred user and both the enterprise website and the user account website.

16. The storage medium of claim 14, wherein the obtained customer information comprises:
   a mobile directory number related to the referred user; and
   an account number related to the referred user.

17. The storage medium of claim 11, wherein:
   the implemented function to determine whether the referred user performed the log in procedure comprises functions to:
     determine whether the first log entry was generated by a computer platform configured as a user account website operated by the organization, the user account website requiring user credentials in order to provide information;
     upon a determination that the first log entry was generated by the user account website operated by the organization, retrieve a transaction identifier from the first log entry, the transaction identifier indicating the referred user performed the log in procedure; and
     obtain, based on the transaction identifier, customer information from a computer platform configured as a user transaction database, the obtained customer information providing identification related to the referred user; and
   the implemented function to notify the fraud prevention system of potential fraudulent activity related to the referred user comprises a function to provide the obtained customer information to the fraud prevention system.

18. The storage medium of claim 17, wherein the obtained customer information comprises:
   a mobile directory number related to the referred user; and
   an account number related to the referred user.

* * * * *